(12) United States Patent
Schoser et al.

(10) Patent No.: US 9,303,981 B2
(45) Date of Patent: Apr. 5, 2016

(54) POSITION-MEASURING DEVICE

(71) Applicant: DR. JOHANNES HEIDENHAIN GmbH, Traunreut (DE)

(72) Inventors: Juergen Schoser, Traunreut (DE); Wolfgang Holzapfel, Obing (DE); Michael Hermann, Tacherting (DE); Volker Hoefer, Palling (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 14/549,605

(22) Filed: Nov. 21, 2014

(65) Prior Publication Data

US 2015/0146217 A1    May 28, 2015

(30) Foreign Application Priority Data

Nov. 28, 2013 (DE) .......................... 10 2013 224 405
Aug. 7, 2014 (DE) .......................... 10 2014 215 633

(51) Int. Cl.
*G01B 11/14* (2006.01)
*G01D 5/347* (2006.01)
*G01D 5/38* (2006.01)

(52) U.S. Cl.
CPC ............ *G01B 11/14* (2013.01); *G01D 5/34715* (2013.01); *G01D 5/38* (2013.01)

(58) Field of Classification Search
CPC ............ G01D 5/2457; G01D 5/34715; G01D 5/34746; G01D 5/366; G01D 5/38; G01B 5/2451; G01D 5/34707; G01B 11/14
USPC ......... 356/614–623; 33/706, 707; 250/237 G, 250/231.14, 231.16
See application file for complete search history.

(56) References Cited

U.S. PATENT DOCUMENTS

| 4,593,472 | A | 6/1986 | Berner |
| 5,010,655 | A | 4/1991 | Rieder et al. |
| 6,541,761 | B1* | 4/2003 | Holzapfel ................ G01D 5/38 D5/38 |
| 8,890,057 | B2* | 11/2014 | Hermann ............... G01D 5/366 250/231.13 |
| 2004/0245442 | A1 | 12/2004 | Gruber |
| 2006/0180748 | A1 | 8/2006 | Schoser et al. |
| 2007/0240325 | A1* | 10/2007 | Pelsue ................. B23K 26/367 33/707 |
| 2011/0188055 | A1 | 8/2011 | Hermann |
| 2012/0281238 | A1 | 11/2012 | Hermann |
| 2012/0292493 | A1 | 11/2012 | Hermann |

FOREIGN PATENT DOCUMENTS

| DE | 4111873 A1 | 10/1992 |
| DE | 10132521 A1 | 1/2003 |

(Continued)

*Primary Examiner* — Hoa Pham
(74) *Attorney, Agent, or Firm* — Leydig, Voit & Mayer, Ltd.

(57) ABSTRACT

A position-measuring device includes a scale and a scanning unit movable relative thereto. The scale has a measuring graduation, a reference mark and area markings located on a first and on a second side of the reference mark which are configured to exert different deflection effects on a scanning beam incident thereon. An area signal detector is configured to detect, during optical scanning of the area markings, a fringe pattern in a detection plane of the area signal detector. A periodic screen grating is disposed between the scale and the area signal detector and is configured to produce the fringe pattern in the detection plane of the area signal detector such that at least two distinguishable scanning signals are generatable from the fringe pattern as a function of a position of the scanning unit relative to the reference mark.

17 Claims, 6 Drawing Sheets

(56) References Cited

FOREIGN PATENT DOCUMENTS

| DE | 102008044858 A1 | 3/2010 |
| --- | --- | --- |
| DE | 102011076055 A1 | 11/2012 |
| EP | 0209676 A2 | 1/1987 |
| EP | 0145844 B1 | 5/1987 |
| EP | 0388390 A2 | 9/1990 |
| EP | 1407231 B1 | 4/2004 |
| EP | 1691172 A2 | 8/2006 |
| EP | 2520906 A1 | 11/2012 |

* cited by examiner

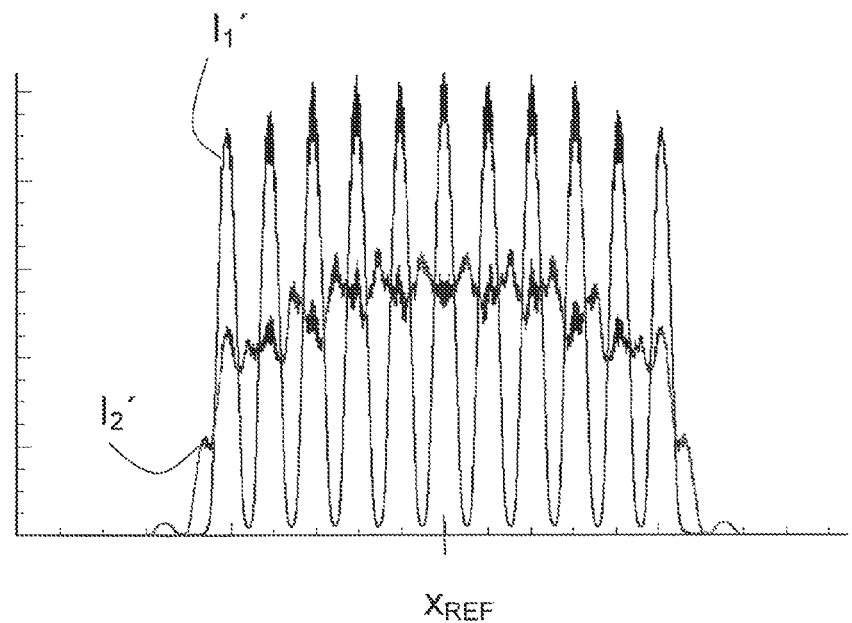
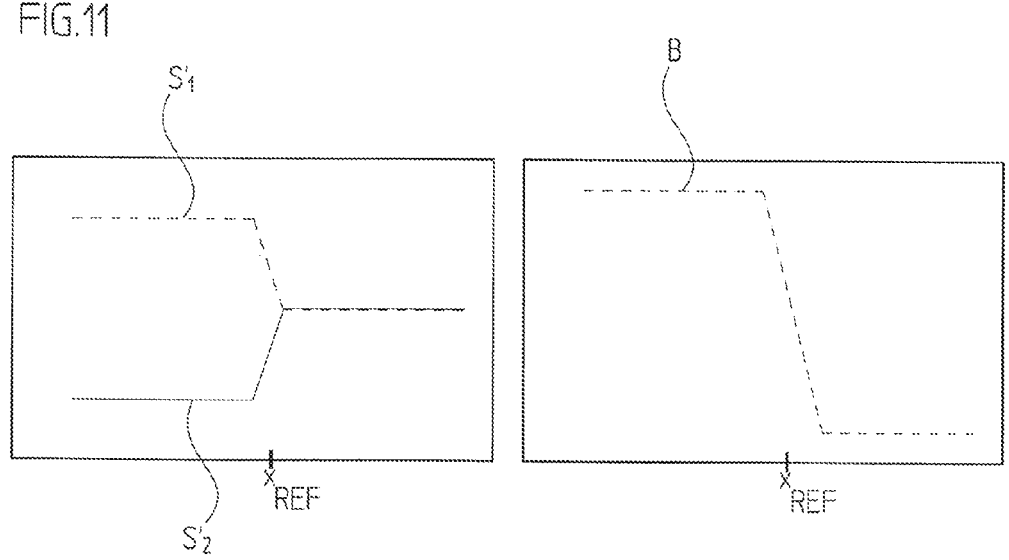

POSITION-MEASURING DEVICE

CROSS-REFERENCE TO PRIOR APPLICATIONS

Priority is claimed to German Patent Application Nos. DE 10 2013 224 405.3, filed on Nov. 28, 2013, and DE 10 2014 215 633.5, filed on Aug. 7, 2014, the entire disclosure of each of these applications being hereby incorporated by reference herein.

FIELD

The present invention relates to a position-measuring device having a scale and a scanning unit movable relative thereto in the measurement direction.

BACKGROUND

Such position-measuring devices are used, in particular, in machine tools for measuring the position of a tool relative to a workpiece to be machined, in coordinate measuring machines for determining the position and dimensions of test objects, as well as in the semiconductor industry, for example, in wafer steppers. Such a position measuring device may be an angle- or length-measuring device, in which the scale is directly attached to the drive unit (rotary motor or linear motor), or the scale is attached to a component driven by the drive unit. The scanning unit of the position-measuring device is stationarily disposed on another machine part opposite the moving scale.

The scale of such a position-measuring device is known, for example, from DE 101 32 521 A1 and has a periodic measuring graduation for generating periodic measurement signals in the form of incremental signals, as well as a reference mark for generating a reference signal. An absolute reference of the incremental position measurement can be established for the position of the reference mark via the reference signal by setting a counter to a predetermined counter value.

At the beginning of a position measurement, as well as for correcting and monitoring the counter value, it is often required to approach the reference mark starting from an arbitrary position. To this end, area markings are provided on the scale, the area markings making it possible to distinguish where the scanning unit is located relative to the reference mark; i.e., whether the scanning unit is located on one or the other side of the reference mark. In the device known from DE 101 32 521 A1, this area marking is configured as a reflective or transparent strip on one side of the reference mark. On the other side of the reference mark, the area marking is embodied as a diffraction grating. A plurality of photoreceivers are arranged in the scanning unit for scanning both area markings. Some of the photoreceivers are only impinged upon by the scanning beam when the scanning unit is located on one side of the reference mark. In contrast, the remaining photoreceivers are only impinged upon by the scanning beam when the scanning unit is located on the other side of the reference mark. An area signal is generated from the scanning signals of the various photoreceivers. The side of the reference mark on which the scanning unit is currently located during position measurement can be inferred from the level of this signal.

The procedure for generating area signals described in DE 101 32 521 A1 is suitable for position-measuring devices with collimated illumination of the scale. However, this concept cannot be used for a position-measuring device with divergent illumination of the scale.

SUMMARY

In an embodiment, the present invention provides a position-measuring device having a scale and a scanning unit movable relative to the scale in a measurement direction. The scale has a measuring graduation, at least one reference mark and area markings located on a first and on a second side of the at least one reference mark which are configured to exert different deflection effects on a scanning beam incident on the area markings. The measuring graduation is optically scannable such that periodic measurement signals are generatable by optically scanning the measuring graduation. The at least one reference mark is optically scannable such that a reference signal is generatable by optically scanning the reference mark. The area markings are optically scannable such that an area signal is generatable by optically scanning the area markings with the scanning beam. An area signal detector is configured to detect, during optical scanning of the area markings, a fringe pattern in a detection plane of the area signal detector. The area signal is usable to distinguish whether the scanning unit is located on the first or on the second side of the reference mark. A periodic screen grating is disposed between the scale and the area signal detector and is configured to produce the fringe pattern in the detection plane of the area signal detector such that at least two distinguishable scanning signals are generatable from the fringe pattern as a function of a position of the scanning unit relative to the at least one reference mark.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 8b shows different signals in connection with the signal processing in the circuit arrangement of FIG. 8a;

FIG. 9b shows different signals in connection with the signal processing in the circuit arrangement of FIG. 9a;

FIG. 10 illustrates the intensity patterns resulting in different positions in the detection plane of the area signal detector in a second exemplary embodiment of the position-measuring device according to the present invention; and FIG. 11 shows different signals in connection with the signal processing of the second exemplary embodiment.

DETAILED DESCRIPTION

Figure 1:
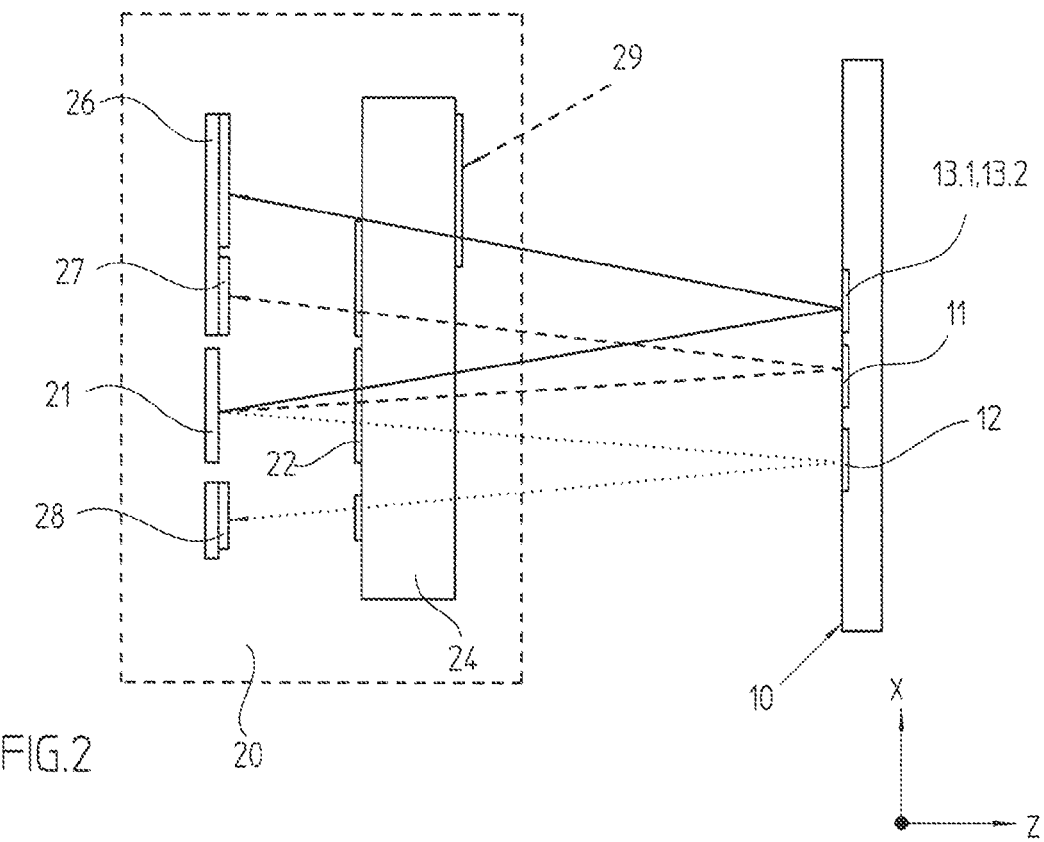
FIG. 1 is a schematic view showing a first exemplary embodiment of the position-measuring device according to the present invention, including the various scanning beam paths.

In an embodiment, the present invention provides a position-measuring device with divergent illumination of the scale, which device enables reliable generation of an area signal which is characteristic of the position of a scanning unit relative to a reference mark.

The position-measuring device according to an embodiment of the present invention includes a scale and a scanning unit movable relative thereto in the measurement direction. The scale has a measuring graduation, periodic measurement signals being generatable by optically scanning the measuring graduation. The scale further has at least one reference mark, a reference signal being generatable by optically scanning the reference mark. Moreover, the scale has optically scannable area markings, an area signal being generatable by optically scanning the area markings with a scanning beam and detection thereof by an area signal detector. The area signal makes it possible to distinguish whether the scanning unit is located on the first or second side of the reference mark. The area markings on the first and second sides of the reference mark exert different deflection effects on the scanning beam incident thereon. Located between the scale and the area signal detector is a periodic screen grating which is adapted and arranged such that, during optical scanning of the area markings, a fringe pattern is produced in the detection plane of the area signal detector, from which fringe pattern at least two distinguishable scanning signals are generatable as a function of the position of the scanning unit relative to the reference mark.

The periodicity of the screen grating may be selected as $$P_{BM} = \lambda / (\sin(\operatorname{atan}(P_{SG}(u+v))))$$

where:
$P_{BM}$:=periodicity of the reflection diffraction grating of the area marking
u:=path length traveled by the scanning beams from the transmission grating via the scale to the screen grating
v:=path length traveled by the scanning beams between the screen grating and the detection plane of the area signal detector
$\lambda$:=wavelength of the light source used
$P_{SG}$:=periodicity of the transmission grating Advantageously, the area marking on the first side of the reference mark is reflective, and the area marking on the second side of the reference mark is configured as a reflection diffraction grating.

The reflection diffraction grating of the area marking may have a different periodicity than the measuring graduation.

In one possible embodiment, the periodicity of the reflection diffraction grating is selected as $$P_{BM} = 2 \cdot v \cdot \lambda / P_{BD}$$

where:
$P_{BM}$:=periodicity of the reflection diffraction grating of the area marking v:=path length traveled by the scanning beams between the screen grating and the detection plane of the area signal detector
$\lambda$:=wavelength of the light source used
$P_{BD}$:=periodicity of the area signal detector Furthermore, it may be provided that the area markings are arranged in an area marking track and the reference mark is arranged in a reference mark track on the scale, the area marking track and the reference mark track extending parallel along the measurement direction.

Moreover, the scale may have several limit regions, the limit regions being formed by partially modifying the optical effect of the area markings or of the reference mark track.

The limit regions may be formed at least in sub-regions of the area marking track or of the reference mark track, transmission gratings or reflection gratings oriented perpendicular to the measuring graduation being arranged in the limit regions.

In one possible embodiment, a divergently emitting light source illuminates a periodic transmission grating without any optical elements disposed therebetween. Disposed downstream of the transmission grating in the direction of beam propagation are the scale including the measuring graduation, the at least one reference mark and the area markings, as well as the screen grating and a detector device including the area signal detector, an incremental signal detector, and a reference signal detector.

Advantageously, the area signal detector is formed by two groups of periodically alternately arranged detector elements, the detector elements of each of the groups being interconnected with one another.

The diffraction grating may be configured as a phase grating with resulting +/−1st diffraction orders and suppressed 0th diffraction order, so that when the scanning beam crosses between the area markings, there results a positional shift of the fringe pattern in the detection plane.

In this connection, it is possible to select the periodicities of the screen grating and the area signal detector and to arrange the screen grating and the area signal detector such that in the event that the scanning unit is positioned on the first side of the reference mark, the first group of detector elements detects a maximum scanning signal, while the second group of detector elements detects a minimum scanning signal, and in the event that the scanning unit is positioned on the second side of the reference mark, the first group of detector elements detects a minimum scanning signal, while the second group of detector elements detects a maximum scanning signal.

In this connection, it may be provided that, for generating the area signal, the scanning signals of the first and second groups of detector elements are feedable to a subtraction element, and the area signal is generatable from the resulting differential signal via a downstream comparator element.

Furthermore, the diffraction grating may be configured as an amplitude or phase grating with resulting 0th and +/−1st diffraction orders, so that when scanning the different area markings, fringe patterns having different average intensities result in the detection plane.

In this connection, it may be provided that, for generating the area signal, the scanning signals of the first and second groups of detector elements are feedable in differently amplified form to a subtraction element, and the area signal is generatable from the resulting differential signal via a downstream comparator element.

Through the measures according to an embodiment of the present invention, it is now possible also in a position-measuring device with divergent illumination of the scale to reliably generate an area signal which is characteristic of the position of the scanning unit relative to a reference mark.

The period fringe patterns resulting in the detection plane are static and, even in the event of movement of the scanning unit relative to the scale, do not have any oscillating signal components arising from the generation of the periodic measurement signals. This allows the scanning signals of the area signal detector to be further processed to generate an area signal in a simple manner in terms of circuit engineering.

In an embodiment of the present invention, no separate processing step is needed for the area markings in the manufacture of the scale. The area marking that is configured as a diffraction grating may be produced together with the patterns required for the measuring graduation and the reference mark in a common processing step.

Figure 2:
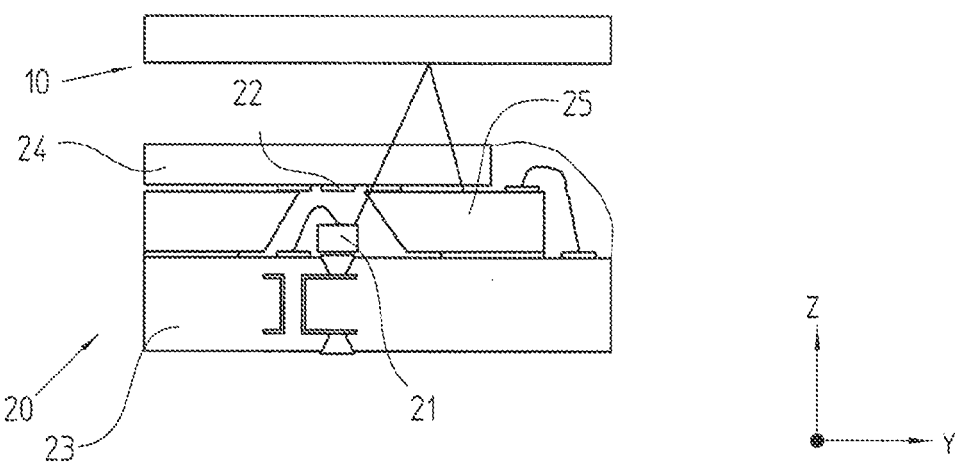
FIG. 2 is another cross-sectional view of the position-measuring device of FIG. 1.

A first exemplary embodiment of the position-measuring device according to the present invention, embodied as a length-measuring device, is shown schematically in the cross-sectional views of FIGS. 1 and 2. FIG. 1 shows various scanning beam paths, while FIG. 2 illustrates the configuration of the scanning unit. The position-measuring device shown includes a scale 10 and a scanning unit 20 movable relative thereto along linear measurement direction x. In the present exemplary embodiment, the position-measuring device according to the present invention is operated with reflected light; i.e., scale 10 is configured as a reflective scale. On scale 10, an incremental measuring graduation 11 is arranged in a centrally disposed measuring graduation track. A reference mark track having at least one reference mark 12 and an area marking track having two area markings 13.1, 13.2 are arranged adjacent to and on both sides of the measuring graduation track perpendicularly to measurement direction x. The various tracks on scale 10 each extend along or parallel to measurement direction x. The scale so configured is shown in a plan view in FIG. 3.

For purposes of optically scanning scale 10, scanning unit 20 includes a divergently emitting light source 21, such as, for example, an LED, which is disposed on a support substrate 23 and illuminates a periodic transmission grating 22 without any optical elements disposed therebetween. Transmission grating 22 takes the form of a transmission amplitude grating having the periodicity $P_{SG}$ and is arranged on the side of a transparent scanning plate 24 that faces light source 21. In a possible variant of this exemplary embodiment, the periodicity of the transmission grating is selected as $P_{SG}=1129$ µm. In the present exemplary embodiment, a further amplitude grating is arranged in the transparent regions of transmission grating 22, this further amplitude grating having a periodicity $P_{SG,INC}$ which is equal to the periodicity $P_{MT}$ of the measuring graduation 11 provided on scale 10. This amplitude grating then functions as a transmission grating during the scanning of measuring graduation 11. After passage through transmission grating 22, the divergent light incident on scale 10 is reflected at measuring graduation 11, at reference mark 12, and at area markings 13.1, 13.2 in a position-dependent manner, and then arrives at a detector device 25. In the present exemplary embodiment, detector device 25 includes an area signal detector 26, an incremental signal detector 27, as well as a reference signal detector 28. A screen grating 29 is arranged on scanning plate 24 between scale 10 and detector device 25 in the path of the scanning beam reflected back from area markings 13.1, 13.2, the screen grating being configured as a transmission amplitude grating having the periodicity $P_{BG}$. In one possible exemplary embodiment, this periodicity is $P_{BG}=172$ µm.

Figure 4:
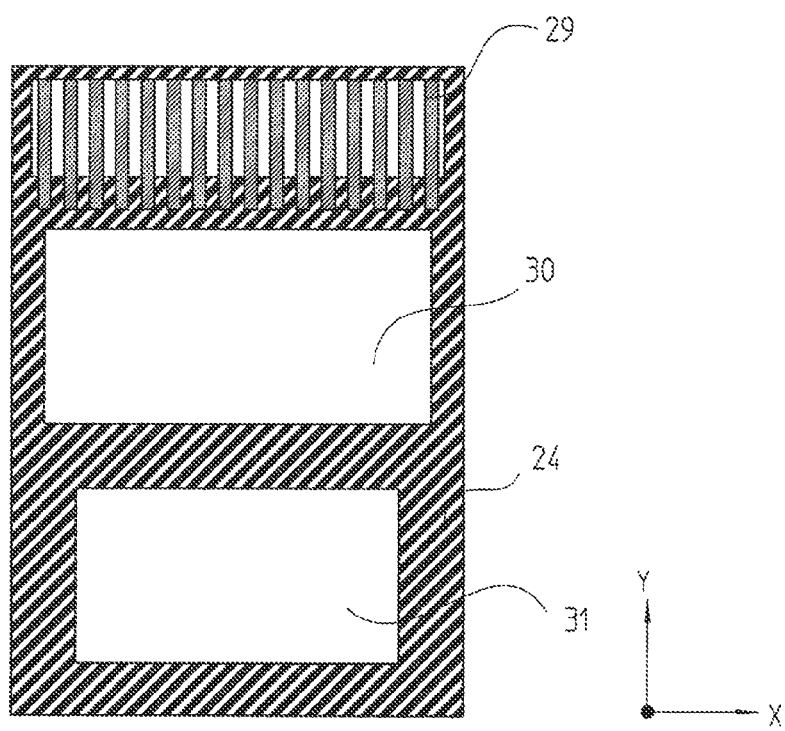
FIG. 4 is a plan view of the scanning plate of the position-measuring device of FIG. 1.
Figure 5:
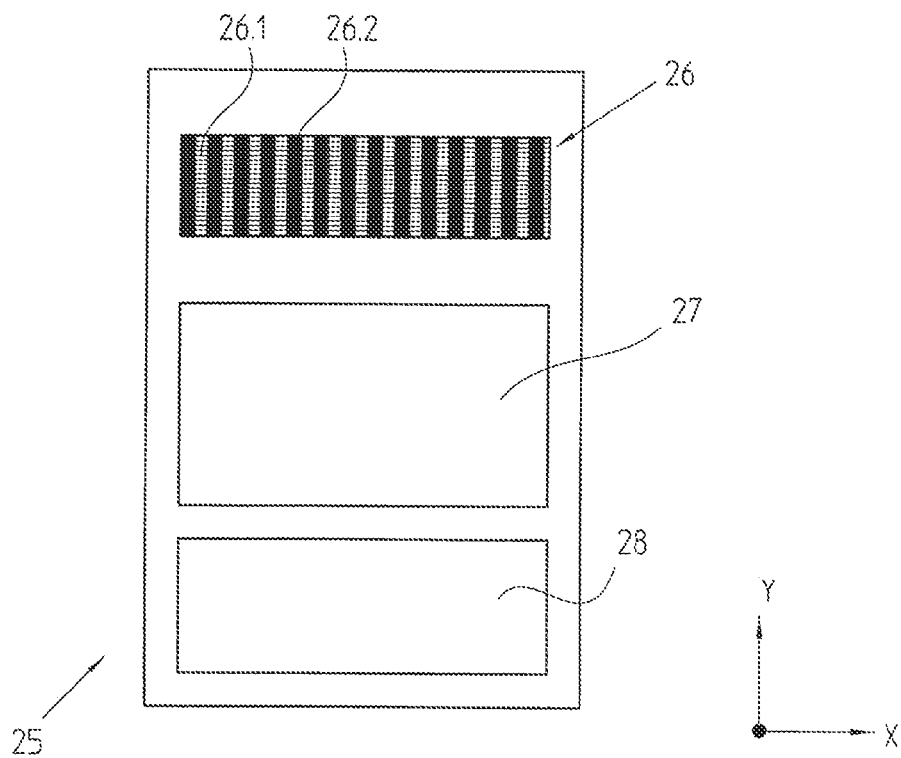
FIG. 5 is a plan view of the detection plane of the position-measuring device of FIG. 1.

FIG. 5 shows a plan view of detector device 25, including the different detectors 26, 27, 28 for acquiring the respective signals. FIG. 4 shows a plan view of the side of scanning plate 24 that faces scale 10, including the screen grating 29 arranged thereon, as well as the transparent; i.e., optically inactive, regions 30, 31 for the scanning beams from the region of measuring graduation 11 and reference mark 12.

From the optical scanning of measuring graduation 11, which has the periodicity $P_{MT}$, which, in one possible exemplary embodiment, is $P_{MT}=8$ µm, periodic measurement signals are generated in the form of a plurality of phase-shifted incremental signals. The specific optical scanning procedure used for generating the incremental signals is irrelevant to the present invention. Different optical scanning principles may be used for this purpose, such as those based on the basic principle known from the publication by R. M. Pettigrew entitled "Analysis of Grating Imaging and its Application to Displacement Metrology" in SPIE Vol. 36, 1st European Congress on Optics Applied to Metrology (1977), pp. 325-332. The incremental signals may then be processed in a known manner by a downstream controller. In this way, it is possible to position relatively movable machines parts which are connected to scanning unit 20 and scale 10.

In order to establish an absolute position reference for the so-generated incremental signals at a defined reference position $x_{REF}$, scale 10 has at least one reference mark 12 in the reference mark track. From the optical scanning of reference mark 12, a reference signal REF is generatable which may be further processed by the controller. With regard to the configuration of reference mark 12 and the optical scanning thereof, various options are in principle possible within the scope of the present invention. In this connection, it is possible to use optical scanning methods such as those described in the Applicant's German Patent Applications DE 10 2008 044 858 A1 and DE 10 2011 076 055 A1.

Through the optical scanning of the area marking track in the device of an embodiment of the present invention, an area signal B is generated which makes it possible to distinguish whether scanning unit 20 is located to the left or to the right of reference mark 12. For this purpose, area markings 13.1, 13.2 are provided on scale 10, the area markings making it possible to distinguish where scanning unit 20 is located relative to reference mark 12. The left side in the view of the scale in FIG. 3 will hereinafter be referred to as the first side, and the right side will be referred to as the second side.

In the present first exemplary embodiment of the position-measuring device according to the present invention, the area marking 13.1 on the first side in the area marking track is reflective, while a reflection diffraction grating in the form of a phase grating is arranged as an area marking 13.2 on the second side in the area marking track. Thus, the differently designed area markings 13.1, 13.2 on the first and second sides of reference mark 12 exert different deflection effects on the scanning beam incident thereon. In this way, as will be described in detail below, an area signal B can be generated which is characteristic of the position of scanning unit 20 relative to reference mark 12.

Like measuring graduation 11 in the measuring graduation track, the reflection diffraction grating of area marking 13.2 extends in the area marking track periodically along measurement direction x. In one possible embodiment of the position-measuring device according to the present invention, the reflection diffraction grating of area marking 13.1 has a periodicity $P_{BM}=3$ µm, and thus differs in its periodicity from the measuring graduation, which has the periodicity $P_{MT}=8$ µm. Advantageously, the periodicity $P_{BM}$ of the reflection diffraction grating is selected approximately as:

$$P_{BM}=\lambda/(\sin(\mathrm{atan}(P_{SG}(u+v)))) \qquad \text{(equation 1)}$$

where:

$P_{BM}$:=periodicity of the reflection diffraction grating of the area marking u:=path length traveled by the scanning beams from the transmission grating via the scale to the screen grating v:=path length traveled by the scanning beams between the screen grating and the detection plane of the area signal detector λ:=wavelength of the light source used $P_{SG}$:=periodicity of the transmission grating In the present first exemplary embodiment of the position-measuring device according to the present invention, the diffraction grating of area marking 13.2 is configured as a phase grating with resulting +/−1st diffraction orders and suppressed 0th diffraction order.

In the scanning beam path for generating area signal B, a periodic screen grating 29 and an area signal detector 26 are disposed in the further beam path; i.e., downstream of scale 10 in the direction of beam propagation. As can be seen from FIG. 1, periodic screen grating 29 is located between scale 10 and area signal detector 26. Screen grating 29, shown in a plan view in FIG. 4, is configured as a transmission amplitude grating composed of transparent and opaque graduation regions which are arranged periodically in measurement direction x. In the present exemplary embodiment, periodicity $P_{BG}$ of screen grating 29 is selected as $P_{BG}$=172 μm. Preferably, periodicity $P_{BG}$ of screen grating 29 is derived according to the following relationship:

$$P_{BG}=u/(u+v)\cdot P_{BD} \quad \text{(equation 2)}$$

where:

$P_{BG}$:=periodicity of the screen grating u:=path length traveled by the scanning beams from the transmission grating via the scale to the screen grating v:=path length traveled by the scanning beams between the screen grating and the detection plane of the area signal detector $P_{BD}$:=periodicity of the area signal detector In the optical scanning procedure provided in the position-measuring device according to an embodiment of the present invention, a geometrically enlarged image of screen grating 29 is projected into the detection plane of area signal detector 26 starting at transmission grating 22 in accordance with the intercept theorem. As can be seen from FIG. 5, which shows the detection plane of detector device 25, area signal detector 26 is formed by two groups of periodically alternately arranged detector elements 26.1, 26.2, the detector elements 26.1, 26.2 of both groups being configured identically. The detector elements 26.1, 26.2 of each of the groups are interconnected with one another. As can further be seen from the figure, the periodic arrangement of detector elements 26.1, 26.2 in area signal detector 26 extends along measurement direction x. The individual detector elements 26.1, 26.2 of area signal detector 26 are rectangular in shape, their longitudinal axis being oriented in the indicated y-direction perpendicularly to measurement direction x.

FIG. 5 further shows, in schematic form, incremental signal detector 27 and reference signal detector 28, whose specific design is not important to the present invention. A great variety of known detector variants may be used here.

The designation u is used herein to refer to the path length traveled by the scanning beams from transmission grating 22 via scale 10 to screen grating 29, while the designation v is used to refer to the path length traveled by the scanning beams between screen grating 29 and the detection plane of area signal detector 26. In one possible exemplary embodiment, these parameters are selected as u=3.471 mm and v=0.565 mm. Detector elements 26.1, 26.2 of area signal detector 26 have a width $b_{BD}$=100 μm in measurement direction x, and accordingly, the periodicity $P_{BD}$ of area signal detector 26 along measurement direction x is $P_{BD}$=200 μm and is identical to the periodicity of the image of screen grating 29 in the detection plane.

Figure 7:
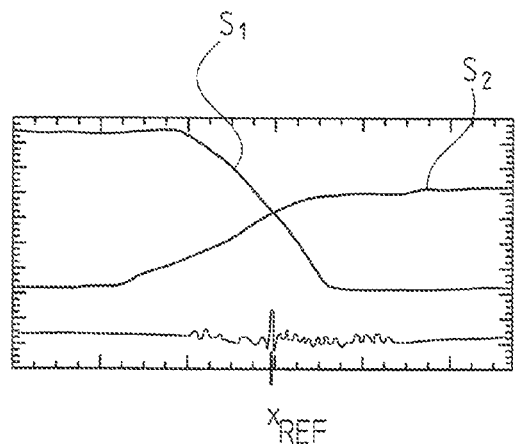
FIG. 7 shows the variation of the scanning signals generated from the detector elements of the area signal detector in the region of the reference mark of the position-measuring device of FIG. 1.

For purposes of generating area signal B from the optical scanning of the differently designed area markings 13.1, 13.2 on scale 10, provision is made to the select periodicity $P_{BG}$ of screen grating 29 and the periodicity $P_{BD}$ of area signal detector 26 in a defined manner and to arrange screen grating 29 and area signal detector 26 in a defined manner. In this exemplary embodiment, this is accomplished in that when scanning unit 20 is located on the first side of reference mark 12, the first group of detector elements 26.1 detects a maximum scanning signal $S_1$ and the second group of detector elements 26.2 detects a minimum scanning signal $S_2$. When scanning unit 20 is located on the second side of reference mark 12, the selected periodicities $P_{BG}$, $P_{BD}$ and the arrangement of screen grating 29 and area signal detector 26 ensure that the first group of detector elements 26.1 detects a minimum scanning signal $S_1$ and the second group of detector elements 26.2 detects a maximum scanning signal $S_2$. The corresponding variation of scanning signals $S_1$, $S_2$ of area signal detector 26 in the region of reference position $x_{REF}$; i.e., to the left and to the right of the reference mark, is shown in FIG. 7, the lower portion of which also shows the generated reference signal. As can be seen from FIG. 7, in the first and second areas, the scanning signals $S_1$, $S_2$ so generated are substantially static even in the event of relative movement between scale 10 and scanning unit 20 and, in particular, do not have any oscillating signal component caused by the generation of the incremental signals. This considerably simplifies the further processing of scanning signals $S_1$, $S_2$. Area signal B, which can be further processed, is obtained from the scanning signals $S_1$, $S_2$ so generated by a suitable circuit arrangement by an operation which will be described hereinafter.

Thus, when in the present exemplary embodiment, the scanning beam impinges on area marking 13.1 on the first or left side of reference mark 12, where the area marking is reflective, then the image of screen grating 29 formed in the detection plane of detector device 25 is not displaced with respect to the optical axis. The periodicity of the periodic light and dark fringe pattern resulting there is equal to the periodicity $P_{BD}$ of area signal detector 26. The first group of detector elements 26.1 detects signal maxima at each of the light areas of the fringe pattern, while the second group of detector elements 26.2 detects signal minima at each of the dark areas of the fringe pattern, which results in a variation of the scanning signals $S_1$, $S_2$ as illustrated in FIG. 7.

However, when scanning unit 20 is located above the second or right side of reference mark 12 and the scanning beam impinges on area marking 13.2, which is configured as a diffraction grating there, then the fringe pattern resulting in the detection plane of area signal detector 26 is displaced by half a light/dark period in measurement direction x as compared to the previous case. This fringe pattern has the same periodicity as in the previous case; i.e., its periodicity is equal to the periodicity $P_{BD}$ of area signal detector 26. Due to the displaced fringe pattern in the detection plane, the first group of detector elements 26.1 now detects signal minima at each of the dark areas of the fringe pattern, while the second group of detector elements 26.2 detects signal maxima at each of the light areas of the fringe pattern.

In this exemplary embodiment, the different optical deflection effects exerted on the incident scanning beam in area markings 13.1, 13.2 may be illustrated as follows: If the incident scanning beam is considered as being plane wavefronts, then, in the region of the area marking 13.2 with the diffraction grating, the wavefronts are tilted by a defined angle such that the periodic intensity pattern in the detection plane is shifted by half a period.

Figure 6:
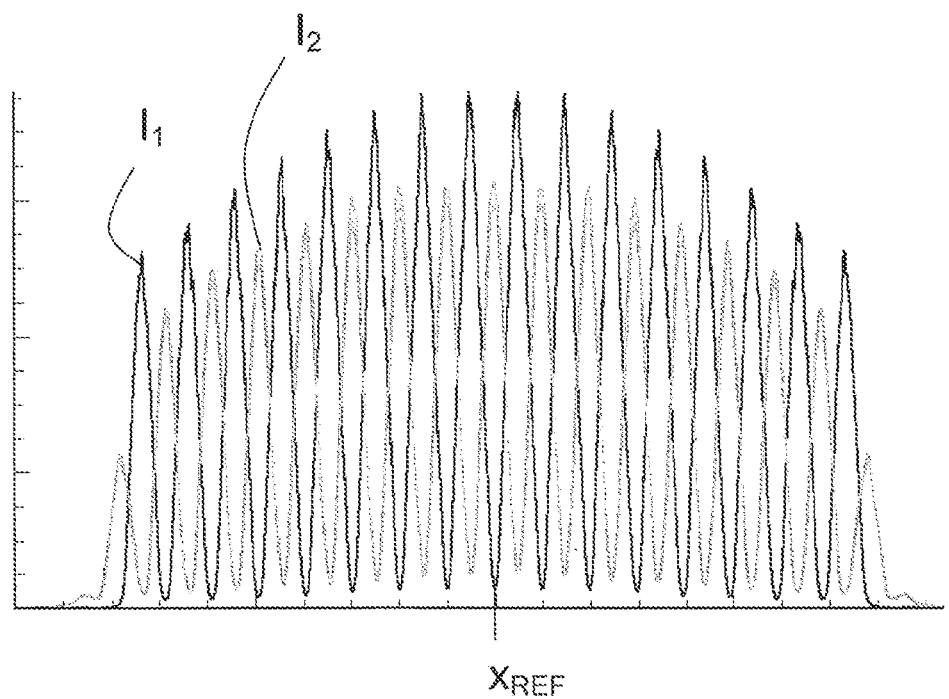
FIG. 6 illustrates the intensity patterns resulting in different positions in the detection plane of the position-measuring device of FIG. 1.

The intensity distributions $I_1$, $I_2$, which are obtained in the detection plane in both cases in this exemplary embodiment of the device according to the present invention, are shown in FIG. 6. In the figure, the intensity distribution $I_1$ resulting from the optical scanning of the first, reflective area marking 13.1 is represented as a black curve, while the intensity distribution $I_2$ resulting from the optical scanning of the second area marking 13.2, which is provided with a diffraction grating, is represented as a gray curve. As can be seen from FIG. 6, the intensity distributions $I_1$, $I_2$ of the two cases are displaced by half a signal period relative to each other along measurement direction x. Thus, the position of scanning unit 20 relative to reference mark 12 can be inferred from scanning signals $S_1$, $S_2$, which are generated from these intensity distributions by means of area signal detector 26.

In this exemplary embodiment, due to the different deflection effect on the scanning beam, area marking 13.2, which is configured as a diffraction grating on the second side of reference mark 12, causes the fringe pattern resulting in the detection plane to be displaced in a defined manner perpendicularly to the optical axis as compared to the non-displaced image formed of screen grating 29 when scanning unit 20 is located above area marking 13.1 on the first side.

Figure 8A:
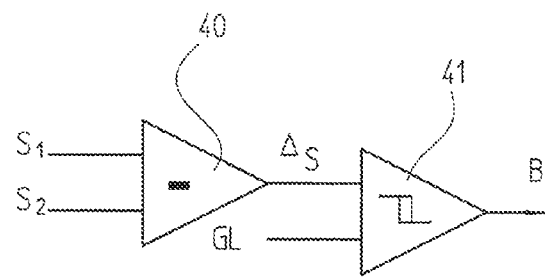
FIG. 8a shows a circuit arrangement for generating an area signal from the processing of the scanning signals of the area signal detector in the region of the reference mark in the position-measuring device of FIG. 1.

An area signal B can then be generated from the so-generated scanning signals $S_1$, $S_2$ as described below. Area signal B clearly indicates on which side of reference mark 12 scanning unit 20 is currently located. To this end, scanning signals $S_1$, $S_2$ are fed to the two inputs of a subtraction element 40, as shown in FIG. 8a. The difference signal $\Delta S = S_1 - S_2$ resulting at the output of subtraction element 40 is shown in the left portion of FIG. 8b. As can be seen, this signal $\Delta S$ has a stepless edge in the region of reference position $x_{REF}$ and a zero crossing at the transition between the two area markings 13.1, 13.2. In order to detect the zero crossing of difference signal $\Delta S$, the difference signal is fed to a first input of a comparator element 41, to the second input of which is applied a reference signal GL. The square-wave output signal of comparator element 41 triggered in this manner finally represents the area signal B, which is shown in the right portion of FIG. 8b and which has a unique level according to the position of the scanning unit relative to reference position $x_{REF}$. In the example shown, the area signal assumes the value "0" when the scanning unit is located on the first (left) side of the reference mark and assumes the value "1" when the scanning unit is located on the second (right) side of the reference mark.

In the position-measuring device described in the German Patent Application DE 101 32 521 A1 mentioned at the outset, so-called control marks are provided at the ends of the scale in addition to the area markings to the left and right of the reference mark. These control marks define the possible extremities of the scanning device and are also referred to as end switches or limit marks. Position-measuring devices having such end switches or limit marks are also described in DE 41 11 873 C2 and EP 0 145 844 B1.

In the present position-measuring device according to an embodiment of the present invention, the function of such limit marks can be implemented particularly advantageously by modifying the optical effect of the area markings 13.1, 13.2 in the respective sub-regions of the area marking track. To this end, in the exemplary embodiment shown, transmission gratings oriented perpendicular to measurement direction x are arranged in limit regions 50.1, 50.2 of the area marking track, as illustrated in the plan view of the scale in FIG. 3. As can be seen from FIG. 3, these transmission gratings extend along the y-direction; i.e., perpendicular to measurement direction x, and the longitudinal direction of the transparent and opaque graduation regions of these transmission gratings is oriented perpendicular to measurement direction x. In one possible exemplary embodiment, the periodicity $P_{LM}$ of the transmission gratings in limit regions 50.1, 50.2 is selected as $P_{LM} = 250$ μm. Alternatively to transmission gratings, it would also be possible to use reflection gratings where the bars are reflective and the gaps are transparent.

Figure 9A:
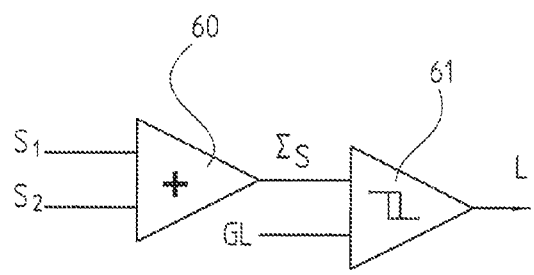
FIG. 9a shows a circuit arrangement for generating a limit signal from the processing of the scanning signals of the area signal detector in the region of the reference mark in the position-measuring device of FIG. 1.
Figure 9B:
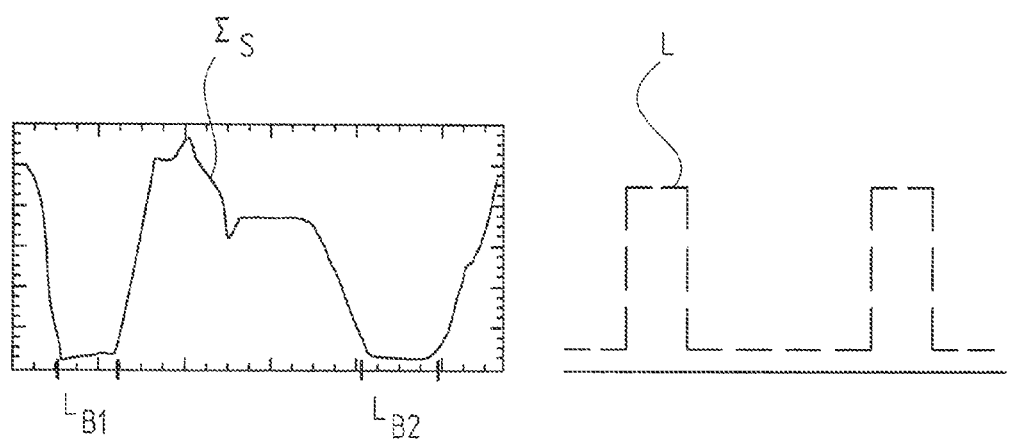

The additional gratings provided in limit regions 50.1, 50.2, here in the form of transmission gratings, influence the scanning signals $S_1$, $S_2$ of area signal detector 26, particularly the otherwise substantially constant sum signal $\Sigma S = S_1 + S_2$ from the two scanning signals $S_1$, $S_2$. Once the scanning unit is located above one of the limit regions 50.1, 50.2, the reflected intensity is reduced due to the reduced reflection effect exerted by the transmission gratings on the scanning beam in these regions, which results in a marked drop in sum signal $\Sigma S$ in regions LB1, LB2. The variation of sum signal $\Sigma S$ and, in particular, the aforementioned signal drop in the regions LB1, LB2, are shown in the left portion of FIG. 9b. According to the circuit arrangement shown in FIG. 9a, in order to generate the square-wave limit signal L, provision is made to feed scanning signals $S_1$, $S_2$ of area signal detector 26 to an addition element 60 and to generate sum signal $\Sigma S$. Sum signal $\Sigma S$ is then fed to a first input of a comparator element 61, to the second input of which is applied a reference signal GL. Reference signal GL may here also be generated optically. For example, a so-called reference mark dc signal may be used for this purpose. The output signal of comparator element 61 so triggered finally represents the square-wave limit signal L, which is shown in the right portion of FIG. 9b, and which allows the subsequent electronics to detect when the scanning unit has reached the limit regions 50.1, 50.2 of the permitted travel range.

In this way, four different regions of scale 10 can be distinguished, namely the left limit region, the region to the left of the reference mark, the region to the right of the reference mark, as well as the right limit region. Since the different deflection of the scanning beam is maintained in limit regions 50.1, 50.2, the directional information (right or left side of the reference mark) is also present in the sub-regions of the area marking track with the limit regions 50.1, 50.2 via area signal B.

Besides configuring limit regions 50.1, 50.2 as transmission gratings arranged over area markings 13.1, 13.2, there are also alternative implementation options. For example, it is possible to configure the limit regions as absorbent layers in the desired sub-regions of the area marking track, to suitably ablate the scale, or to removably mount a masking structure to the scale in these regions. The basic principle of all these variants is to partially modify the optical effect of the area markings on the scanning beam. The result here should generally be a reduction in the intensity of the scanning signals of the area signal detector of between 20% and 80%. Thus, it is still guaranteed that an area signal B can be reliably generated also in these regions.

Figure 3:
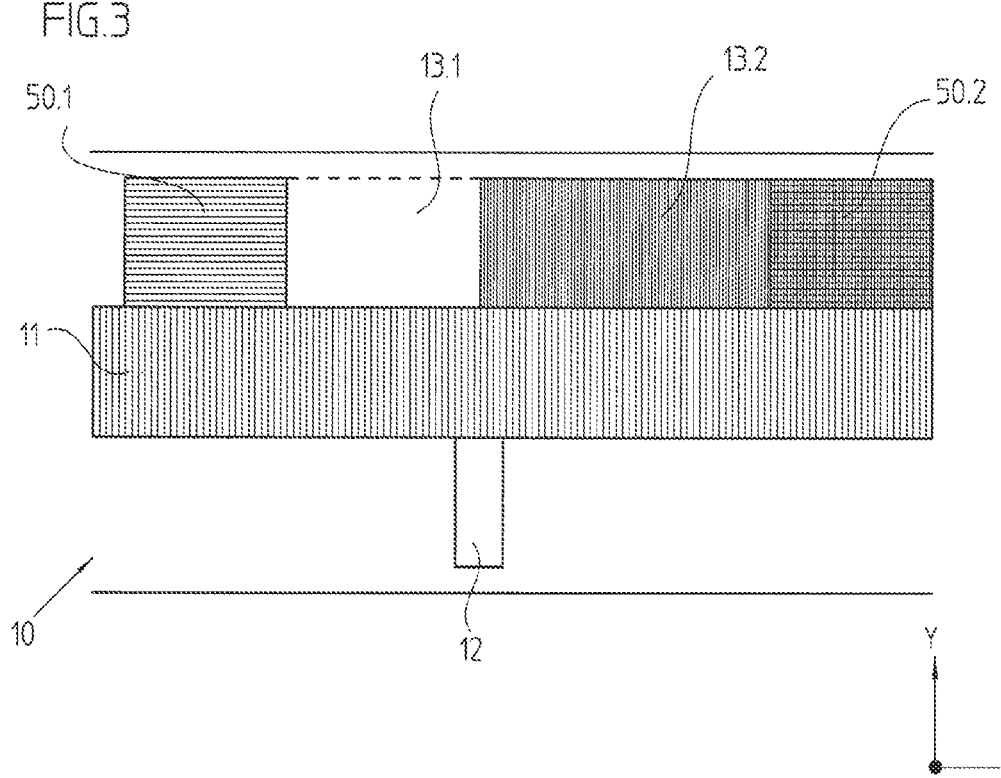
FIG. 3 is a plan view of the scale of the position-measuring device of FIG. 1.

Furthermore, alternatively to the variant illustrated in FIG. 3, the limit regions may also be arranged in the reference mark track on the scale. In this case, analogous to the described example, the limit regions have to be configured such that the optical effect is suitably partially altered in the respective regions of the reference mark track. For further details on such a variant, reference is made to the explanations concerning the previous example.

Figure 8B:
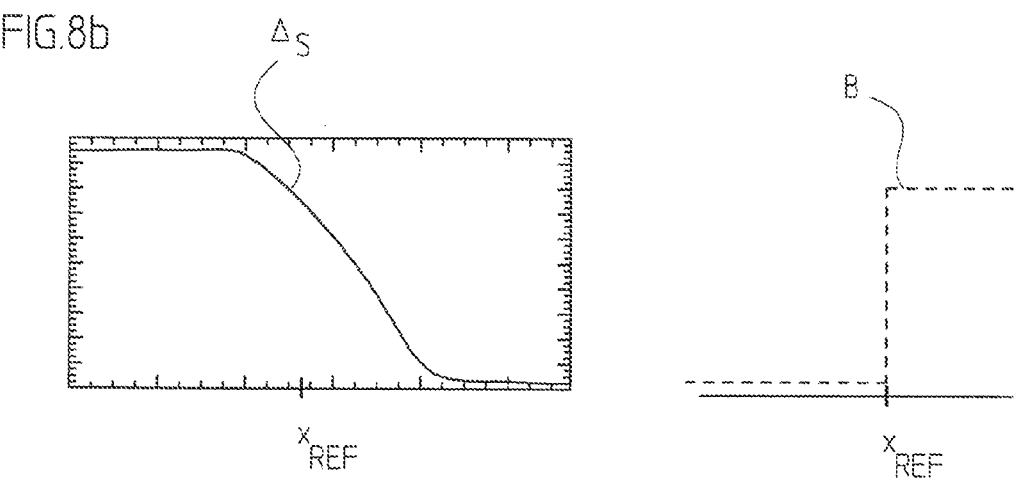

A second exemplary embodiment of the position-measuring device according to the present invention will be described below with reference to FIGS. 10 and 11, which substantially correspond to the views in FIGS. 7 and 8b of the first exemplary embodiment. In this connection, substantially only the relevant differences from the illustrated first exemplary embodiment will be discussed.

In the first exemplary embodiment, the diffraction grating of second area marking 13.2 was configured such that the 0th diffraction order was substantially suppressed and the resulting +/−1st diffraction orders were primarily used for signal acquisition. In the present second exemplary embodiment, an amplitude or phase grating is now provided as the diffraction grating of the second area marking. In addition to the +/−1st diffraction orders, this amplitude or phase grating also has a strong resulting 0th diffraction order. In an implementation as a phase grating, this phase grating has a peak deviation of 90°.

Due to the use of a diffraction grating configured in such a manner for the second area marking, the static fringe pattern in the detection plane is not shifted in position when the scanning beam passes from the first reflective area marking to the second area marking having the correspondingly configured diffraction grating, but instead the average intensity of this fringe pattern is reduced. Thus, during the scanning of the different area markings, fringe patterns having different average intensities are produced in the detection plane of the area signal detector. In FIG. 10, this is shown analogously to the view of FIG. 6 for the second exemplary embodiment, in which a suitably configured diffraction grating is used as the second area marking having the periodicity $P_{BM}$=3 μm. In FIG. 10, the designation $I_1'$ (black curve) is used to refer to the intensity distribution of the fringe pattern in the detection plane when the first reflective area marking is scanned. This intensity distribution is identical to the resulting intensity distribution $I_1$ in the first exemplary embodiment. The designation $I_2'$ (gray curve) is used in FIG. 10 to refer to the intensity distribution of the fringe pattern in the detection plane when the second area marking in the form of a diffraction grating is scanned, which now has a strong 0th diffraction order. In this case, as can be seen from the figure, the resulting fringe pattern has a lower average intensity. Again, a unique area signal B can be derived from the different average intensities of the generated scanning signals $S_1'$, $S_2'$.

The area signal detector used for scanning the fringe pattern in the detection plane is here configured in the same manner as in the first exemplary embodiment above and includes two groups of interconnected detector elements which produce the scanning signals $S_1'$, $S_2'$, such as are shown in the left portion of FIG. 11 for the second exemplary embodiment. Scanning signals $S_1'$, $S_2'$ are then fed to a circuit arrangement, such as is shown in FIG. 8a, at the output of which is then present the area signal B', which is further processable and is shown in the right portion of FIG. 11. However, in contrast to the exemplary embodiment above, to generate such an area signal B' in the present exemplary embodiment, different amplification factors $V_1$, $V_2$ must be selected for the supplied scanning signals $S_1'$, $S_2'$ at the subtraction element. For example, in the exemplary embodiment shown, the amplification factors are selected as $V_1$=1, $V_2$=2.

In modified variants of the second exemplary embodiment of the position-measuring device according to the present invention, other grating periods may, of course, also be used for the diffraction grating of the second area marking. In the case of an alternatively selected periodicity $P_{BM}$=3 μm of the diffraction grating, the average intensity during the scanning of the second area marking is not as markedly reduced as in the example of FIG. 10. However, by suitably selecting the amplification factors of the subtraction element, it is nevertheless possible to generate a suitable area signal, as explained above.

In addition to the exemplary embodiments specifically described herein, other embodiments are, of course, possible within the scope of the present invention.

For example, the position-measuring device of the present invention may be configured as a transmitted light system in which a transmissive scale is employed.

Furthermore, the screen grating provided in the path of the scanning beam for generating the area signal may also be configured as a phase grating.

It is also possible to arrange the screen grating on each side of the scanning plate. In this connection, it is conceivable, for example, to arrange the screen grating on the front side of the scanning plate and to arrange a suitably configured detector on the opposite rear side of the scanning plate.

Further, instead of arranging the measuring graduation track centrally on the scale, it would also be possible to arrange the reference mark track centrally and to arrange the area marking track and the measuring graduation track laterally adjacent thereto.

Moreover, instead of position-measuring devices for measuring linear movements, position-measuring devices for measuring rotary movements may, of course, also be configured correspondingly, etc.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device, comprising:
   a scale having a measuring graduation, at least one reference mark and area markings located on a first and on a second side of the at least one reference mark which are configured to exert different deflection effects on a scanning beam incident on the area markings, the measuring graduation being optically scannable such that periodic measurement signals are generatable by optically scanning the measuring graduation, the at least one reference mark being optically scannable such that a reference signal is generatable by optically scanning the reference mark and the area markings being optically scannable such that an area signal is generatable by optically scanning the area markings with the scanning beam, an area signal detector configured to detect, during optical scanning of the area markings, a fringe pattern in a detection plane of the area signal detector, a scanning unit movable relative to the scale in a measurement direction, the area signal being usable to distinguish whether the scanning unit is located on the first or on the second side of the reference mark, and a periodic screen grating disposed between the scale and the area signal detector and configured to produce the fringe pattern in the detection plane of the area signal detector such that at least two distinguishable scanning signals are generatable from the fringe pattern as a function of a position of the scanning unit relative to the at least one reference mark.

2. The position-measuring device as recited in claim 1, wherein a periodicity of the screen grating corresponds to:

$$P_{BG}=u/(u\pm v)\cdot P_{BD}$$

where:

$P_{BG}$ is the periodicity of the screen grating, u is a path length traveled by a scanning beam from a transmission grating via the scale to the screen grating, v is a path length traveled by a scanning beam between the screen grating and the detection plane of the area signal detector, and $P_{BD}$ is a periodicity of the area signal detector.

3. The position-measuring device as recited in claim 1, wherein the area marking on the first side of the at least one reference mark is reflective, and the area marking on the second side of the at least one reference mark is configured as a reflection diffraction grating.

4. The position-measuring device as recited in claim 3, wherein the reflection diffraction grating has a different periodicity than the measuring graduation.

5. The position-measuring device as recited in claim 4, wherein the periodicity of the reflection diffraction grating corresponds to:

$$P_{BM}=\lambda/(\sin(\mathrm{atan}(P_{SG}(u+v))))$$

where:

$P_{BM}$ is the periodicity of the reflection diffraction grating of the area marking, u is a path length traveled by a scanning beam from a transmission grating via the scale to the screen grating, v is a path length traveled by a scanning beam between the screen grating and the detection plane of the area signal detector, $\lambda$ is a wavelength of a light source used, and $P_{SG}$ is a periodicity of the transmission grating.

6. The position-measuring device as recited in claim 3, wherein the reflection diffraction grating is configured as a phase grating with resulting $+/-1^{st}$ diffraction orders and a suppressed $0^{th}$ diffraction order such that a positional shift of the fringe pattern in the detection plane results upon the scanning beam crossing between the area markings.

7. The position-measuring device as recited in claim 6, wherein the area signal detector includes a first group and a second group of detector elements, and wherein respective periodicities of the screen grating and the area signal detector are such that, and the screen grating and the area signal detector are arranged such that:

the first group of detector elements detects a maximum scanning signal, while the second group of detector elements detects a minimum scanning signal in a situation where the scanning unit is positioned on the first side of the at least one reference mark, and the first group of detector elements detects a minimum scanning signal, while the second group of detector elements detects a maximum scanning signal in a situation where the scanning unit is positioned on the first side of the at least one reference mark.

8. The position-measuring device as recited in claim 6, wherein the area signal detector includes a first group and a second group of detector elements, and wherein, for generating the area signal, scanning signals of the first and second groups of detector elements are feedable to a subtraction element, the area signal being generatable from a resulting differential signal via a downstream comparator element.

9. The position-measuring device as recited in claim 3, wherein the reflection diffraction grating is configured as an amplitude or phase grating with resulting $0^{th}$ and $+/-1^{st}$ diffraction orders such that fringe patterns having different average intensities result in the detection plane upon scanning the different area markings.

10. The position-measuring device as recited in claim 9, wherein the area signal detector includes a first group and a second group of periodically alternately arranged detector elements, the detector elements of each of the groups being interconnected with one another, and wherein, for generating the area signal, scanning signals of the first and second groups of detector elements are feedable in differently amplified form to a subtraction element, the area signal being generatable from a resulting differential signal via a downstream comparator element.

11. The position-measuring device as recited in claim 1, wherein the area markings are arranged in an area marking track and the at least one reference mark is arranged in a reference mark track on the scale, the area marking track and the reference mark track extending parallel along the measurement direction.

12. The position-measuring device as recited in claim 11, wherein the scale has a plurality of limit regions formed by an optical effect of the area markings or of the reference mark track being partially modified.

13. The position-measuring device as recited in claim 12, wherein the limit regions are formed at least in sub-regions of the area marking track or of the reference mark track, transmission gratings or reflection gratings oriented perpendicular to the measuring graduation being arranged in the limit regions.

14. The position-measuring device as recited in claim 1, further comprising:

a divergently emitting light source configured to illuminate a periodic transmission grating without any optical elements disposed therebetween, and a detector device including the area signal detector, an incremental signal detector and a reference signal detector, wherein the scale, including the measuring graduation, the at least one reference mark and the area markings, the screen grating and the detector device, including the area signal detector, the incremental signal detector and the reference signal detector, are disposed downstream of the transmission grating in a direction of beam propagation.

15. The position-measuring device as recited in claim 1, wherein the area signal detector includes a first group and a second group of periodically alternately arranged detector elements, the detector elements of each of the groups being interconnected with one another.

16. The position-measuring device as recited in claim 15, wherein respective periodicities of the screen grating and the area signal detector are such that, and the screen grating and the area signal detector are arranged such that:
- the first group of detector elements detects a maximum scanning signal, while the second group of detector elements detects a minimum scanning signal in a situation where the scanning unit is positioned on the first side of the at least one reference mark, and
- the first group of detector elements detects a minimum scanning signal, while the second group of detector elements detects a maximum scanning signal in a situation where the scanning unit is positioned on the first side of the at least one reference mark.

17. The position-measuring device as recited in claim 15, wherein, for generating the area signal, scanning signals of the first and second groups of detector elements are feedable to a subtraction element, the area signal being generatable from a resulting differential signal via a downstream comparator element.

* * * * *